(12) United States Patent
Tanaka et al.

(10) Patent No.: US 8,099,507 B2
(45) Date of Patent: Jan. 17, 2012

(54) MANAGEMENT SYSTEM, MANAGEMENT METHOD AND MANAGEMENT PROGRAM

(75) Inventors: Kazuyoshi Tanaka, Tokyo (JP); Yutaka Yasunaga, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 184 days.

(21) Appl. No.: 12/177,548

(22) Filed: Jul. 22, 2008

(65) Prior Publication Data

US 2009/0089443 A1 Apr. 2, 2009

(30) Foreign Application Priority Data

Sep. 11, 2007 (JP) ................................ 2007-235818

(51) Int. Cl.
*G06F 15/16* (2006.01)
(52) U.S. Cl. ........ 709/228; 709/217; 709/224; 709/229; 709/233
(58) Field of Classification Search .................. 709/223, 709/227, 228; 358/1.15
See application file for complete search history.

(56) References Cited

U.S. PATENT DOCUMENTS

| 5,224,157 | A | 6/1993 | Yamada et al. |
| 6,745,235 | B2 * | 6/2004 | Baca et al. .................... 709/217 |
| 6,999,191 | B2 | 2/2006 | Yamada et al. |
| 7,149,806 | B2 * | 12/2006 | Perkins et al. ................ 709/229 |
| 2004/0184066 | A1 * | 9/2004 | Urabe ........................... 358/1.14 |
| 2004/0260831 | A1 * | 12/2004 | Dyck et al. ..................... 709/233 |
| 2006/0136628 | A1 * | 6/2006 | Choi .............................. 710/72 |
| 2006/0173997 | A1 * | 8/2006 | Tullberg et al. ............... 709/224 |
| 2007/0214274 | A1 * | 9/2007 | Takahashi et al. ............ 709/229 |

FOREIGN PATENT DOCUMENTS

JP 2002-55796 2/2002

* cited by examiner

*Primary Examiner* — Yves Dalencourt
(74) *Attorney, Agent, or Firm* — Cantor Colburn LLP (57) ABSTRACT

A management system including a management apparatus and a managed apparatus connected with each other by a communications network, the system having a registration controller, wherein in an initial registration phase where the managed apparatus sends a registration request notice to the management apparatus, and the management apparatus returns a registration permission notice to the managed apparatus; in cases where a first communications method is utilized that enables immediate mutual communication, the registration controller determines that a final registration has completed when the managed apparatus has received the registration permission notice; and in cases where a second communications method via a server is utilized, the registration controller determines that a temporary registration has completed when connection between the managed apparatus and the server has been established, and when the managed apparatus has acquired the registration permission notice, the registration controller determines that the final registration has completed.

13 Claims, 6 Drawing Sheets

MANAGEMENT SYSTEM, MANAGEMENT METHOD AND MANAGEMENT PROGRAM

CROSS REFERENCE TO RELATED APPLICATION

The present application is based on Japanese Patent Application No. 2007-235818 filed with Japanese Patent Office on Sep. 11, 2007, the entire content of which is hereby incorporated by reference.

BACKGROUND OF THE INVENTION

1. Field of the Invention

The present invention relates to a management system provided with a management apparatus, managed apparatus, a management method in this management system, and a management program operated by the managed apparatus.

2. Description of Related Art

There has been widespread use of a photocopier and MFP (Multi-Function Peripheral) provided with a copying function, facsimile function, printer function and scanner function (hereinafter collectively referred to as "image forming apparatus). This image forming apparatus is characterized by a high level of availability factor, a great number of consumable parts and requirements for periodic maintenance and inspection. Thus, when installing an image forming apparatus at a user-specified location, a service person connects the image forming apparatus with the management apparatus via the communications network and registers the image forming apparatus in the management apparatus. After that, the management apparatus obtains management information on the number of prints, frequency of use, maintenance history and history on the replacement of various parts from the image forming apparatus. The image forming apparatus is managed based on this management information.

The conventional method of communications between an image forming apparatus and management apparatus having been used so far includes the technique wherein the image forming apparatus and management apparatus are connected via the telephone line or FAX line, and a data signal is converted via the modem and is sent and received via the analog telephone line. In another technique includes in this conventional method, a data signal is sent and received via the digital telephone line such as ISDN (Integrated Services Digital Network) (hereinafter referred to as "telephone line system") (e.g., see U.S. Pat. No. 5,224,157).

In a further technique having been used, an image forming apparatus and management apparatus are connected via the communications network such as the Internet, and an electronic mail with data described thereon is packetized and is sent and received via a mail server (hereinafter referred to as "electronic mail system") (see the Japanese Unexamined Patent Application Publication No. 2002-55796).

A proposal has also been made of a system (hereinafter referred to as "HTTP system") for writing/reading the data from each of the management apparatus and image forming apparatus, using the HTTP (Hypertext Transfer Protocol) server such as WebDAV (Distributed Authoring and Versioning protocol for the WWW) server. A further proposal is the image forming apparatus that allows transmission and reception of data according to the communications method selected from among a plurality of communications methods.

As described above, there are various forms of communications method between the image forming apparatus and management apparatus, and the method of connection differs according to each communications method. This takes much time for a service person to register the image forming apparatus in the management apparatus at the user (hereinafter referred to as "initial registration").

To put it another way, in the telephone line system, a registration request notice is sent from the image forming apparatus when the image forming apparatus and management apparatus are connected over the telephone line. Then the registration permission notice can be received immediately from the management apparatus. This permits immediate termination of initial registration. In the electronic mail system, however, a mail server is located between the image forming apparatus and management apparatus. If a registration request notice mail is sent from the image forming apparatus, there is no knowing when a registration permission notice mail can be received from the management apparatus. This requires a lot of initial registration time. At the same time, an HTTP server is located between the image forming apparatus and management apparatus in the case of HTTP system. Thus, even if the image forming apparatus has written a registration request notice into the HTTP server, there is no knowing when the management apparatus writes the registration permission notice. This also takes a lot of time in initial registration.

The initial registration procedure differs according to the communications method, and the time of registration termination also different. This leads to a complicated procedure for initial registration operation.

The aforementioned problem arises not only in the case of managing the image forming apparatus, but also in any of the managed apparatuses in the same manner wherein the operation is managed by registration into the management apparatus.

The object of the present invention is to solve the aforementioned problems and to provide a management system, management method and management program capable of ensuring quick and simple initial registration, independently of any communications method used.

SUMMARY OF THE INVENTION

To achieve the aforementioned object, a system reflecting one aspect of the present invention is a management system including a management apparatus and a managed apparatus which being managed by the management apparatus, connected with each other by a communications network; the management system comprising a registration controller, wherein in an initial registration phase where the managed apparatus sends a registration request notice to the management apparatus, and the management apparatus returns a registration permission notice to the managed apparatus in response to the registration request notice;

in cases where a first communications method is utilized that enables immediate mutual communication between the management apparatus and the managed apparatus, the registration controller determines that a final registration has completed at a phase when the managed apparatus has received the registration permission notice from the management apparatus, and in cases where a second communications method via a server is utilized between the management apparatus and managed apparatus, the registration controller determines that a temporary registration has completed at a phase when connection between the managed apparatus and the server has been established, and at a phase when the managed apparatus has acquired the registration permission notice from the management apparatus, the registration controller determines that the final registration has completed.

The system reflecting another aspect of the present invention is the management system further including a display section capable of discriminatively displaying the completion of the temporary registration and the completion of the final registration.

In the first communications method of the present the management system, it is preferable that the management apparatus and the managed apparatus are connected via a telephone line, and in the second communications method the management apparatus and the managed apparatus are connected via a mail server or an HTTP server.

In the present management system, the phase when the connection between the managed apparatus and the server has been established can be one of a phase when the managed apparatus has sent a mail of the registration request notice to the mail server, and a phase when the managed apparatus has created a directory to store the registration request notice into the HTTP server.

In the present management system, the aforementioned registration controller can be configured to enable to use some of functions preset on the managed apparatus, when the registration controller has determined that the temporary registration has completed.

In the present management system, in the case of the aforementioned second communications method, the aforementioned registration controller can be configured to be capable of making selection as to whether or not to make the decision of completion of the temporary registration in the case of the second communications method.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

As described with reference to the prior art, to ensure that the image forming apparatus can be managed by the management apparatus, the service person has to make an initial registration of the image forming apparatus at the location of a user. The method of communication between the image forming apparatus and management apparatus includes various forms of systems such as a telephone line system, electronic mail system and HTTP system. Especially in the electronic mail system and HTTP system, it is necessary to wait for a reply from the management apparatus. This takes much time in initial registration, according to the conventional art. Further, different communications methods involve different procedures and different time intervals for termination of registration. This has led to complicated initial registration procedure.

In the meantime, the image forming apparatus includes the functions that require registration from the viewpoint of security such as the printer function for outputting the printing job or the function of saving the printing job sent from the client according to the instruction of the client connected to the communications network. The image forming apparatus also includes the functions that need not be registered, as exemplified by the copying function for reading documents mounted on the document platen, and outputting the result. The latter functions does not raise any problem if they are enabled before termination of the registration. From the viewpoint of ensuring improved services, it is preferred that the image forming apparatus should be enabled at the earliest possible time.

The present invention provides classifications in the concept of registration: One is the concept of the final registration wherein, after sending a registration request notice to the management apparatus, the image forming apparatus has received a registration permission notice from the management apparatus (so-called tight coupling wherein the image forming apparatus is tightly coupled with the management apparatus). By contrast to this concept, the present invention introduces a concept of temporary registration wherein the connection with image forming apparatus and the equipment in the periphery thereof (e.g., mail server and HTTP) has been established (so-called loose coupling wherein the image forming apparatus is not tightly coupled with the management apparatus). The registration is terminated in the phase of temporary registration, whereby the time for initial registration is reduced and initial registration procedure is unified. The following provides the specific description with reference to drawings.

EXAMPLE

Figure 4:
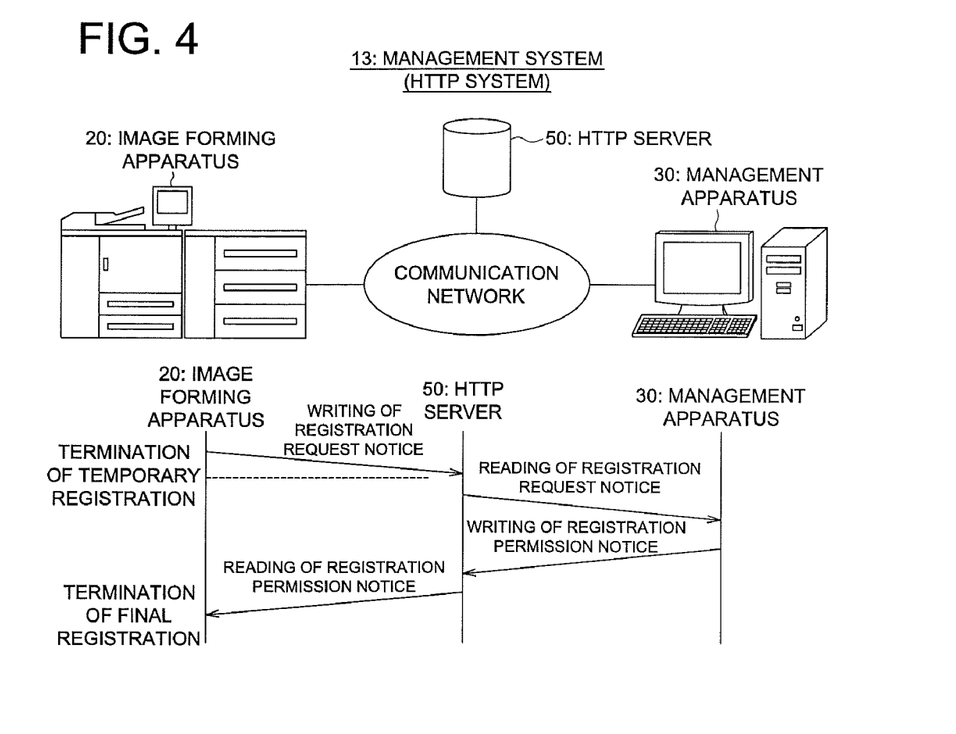
FIG. 4 is a diagram schematically representing a still further structure of the management system as the example of the present invention.
Figure 5:
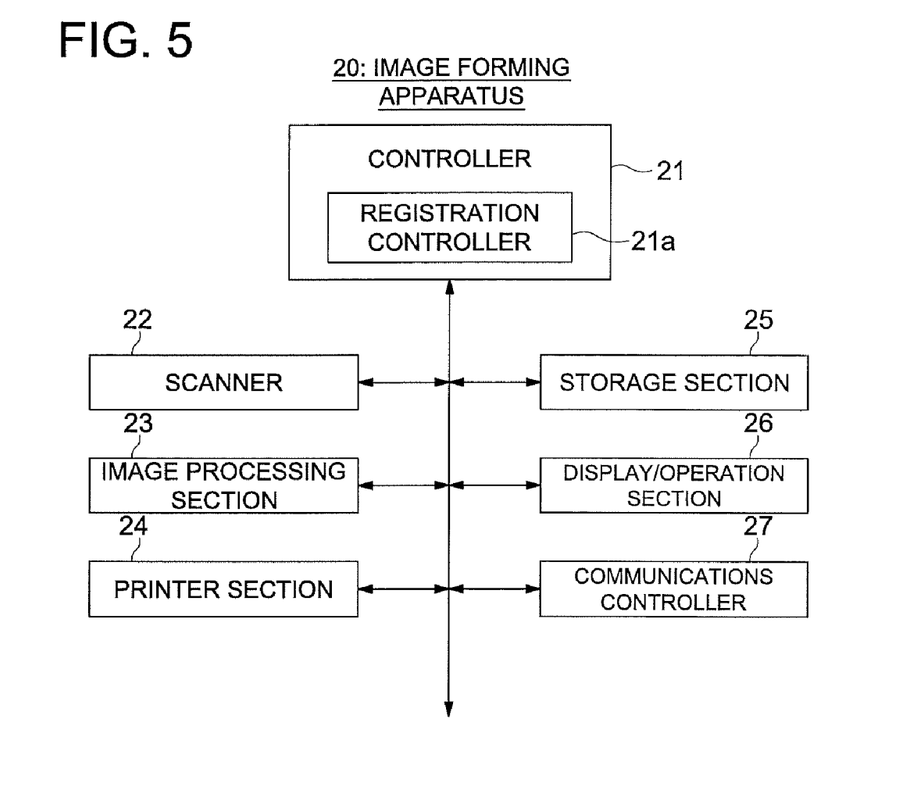
FIG. 5 is a block diagram representing the structure of the image forming apparatus as the example of the present invention.
Figure 6:
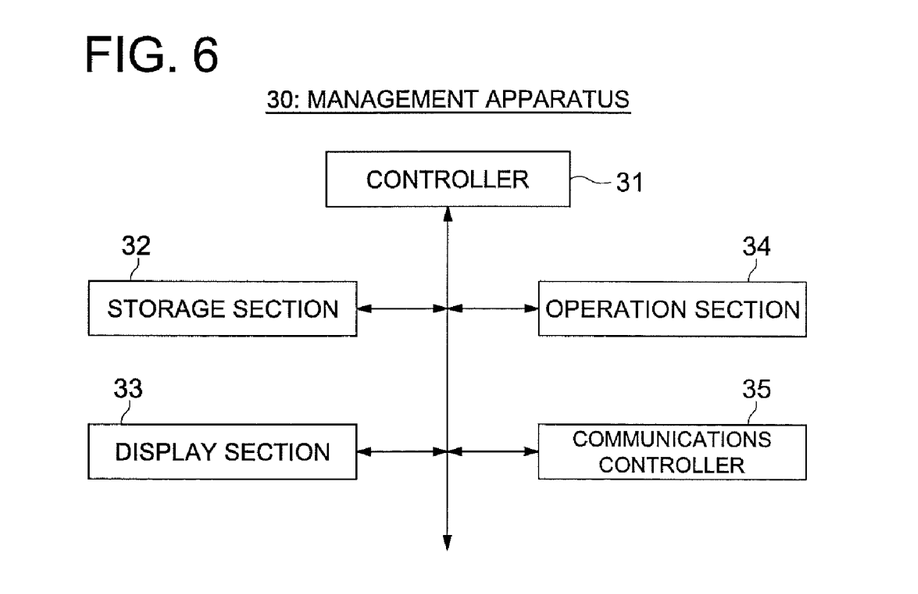
FIG. 6 is a block diagram representing the structure of the management apparatus as the example of the present invention.

To give further details of the aforementioned embodiment of the present invention, the management system, management method and management program as an example of the present invention will be described with reference to FIGS. 1 through 10. FIGS. 1 through 4 are diagrams schematically representing the structure of the management system as the present example. FIG. 5 is a block diagram representing the structure of the image forming apparatus as the example of the present invention. FIG. 6 is a block diagram representing the structure of the management apparatus. FIGS. 7 through 10 are the flow charts showing the initial registration procedure using the management system of the present example.

The management system of the present invention includes one or more managed apparatuses as objects to be managed (image forming apparatus in the present example), and one or more management apparatuses for managing the one or more managed apparatuses. They are connected with each other via the communications network. This management system is classified as follows, according to the method of communication between the managed apparatus and management apparatus.

Figure 1:
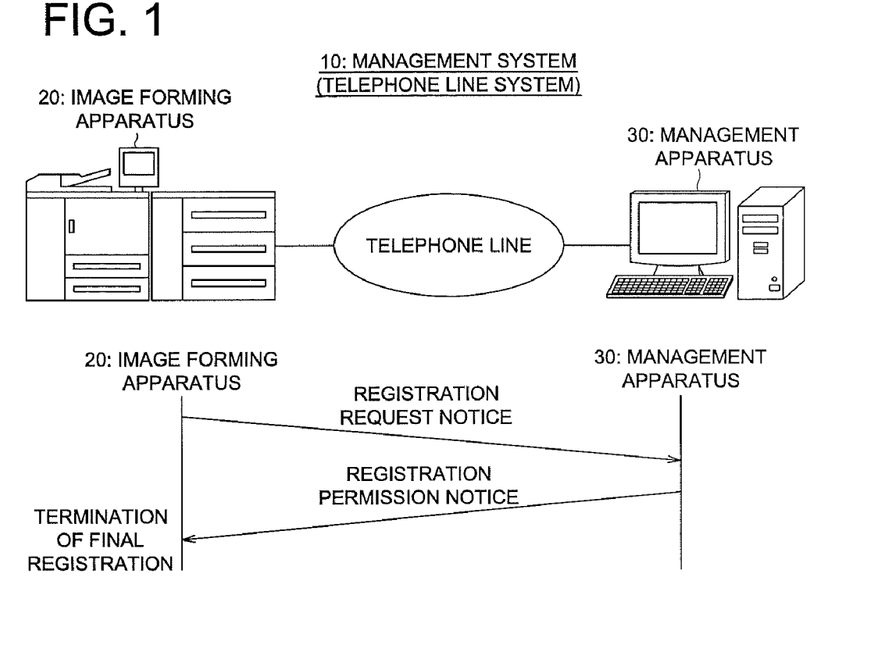
FIG. 1 is a diagram schematically representing one structure of the management system as an example of the present invention.

To put it more specifically, in the management system 10 of FIG. 1, the image forming apparatus 20 and management apparatus 30 are connected with each other via the analog telephone line, digital telephone line or FAX line (hereinafter referred to as "telephone line system"). In this system, the image forming apparatus 20 gives a telephone call to the management apparatus 30 in the initial registration. After connection of the telephone line has been established, initial registration request information is sent from the image forming apparatus 20 to the management apparatus 30 (hereinafter referred to as "registration request notice"). Initial registration permission information (hereinafter referred to as "registration permission notice") is immediately given from the management apparatus 30 to the image forming apparatus 20.

Figure 2:
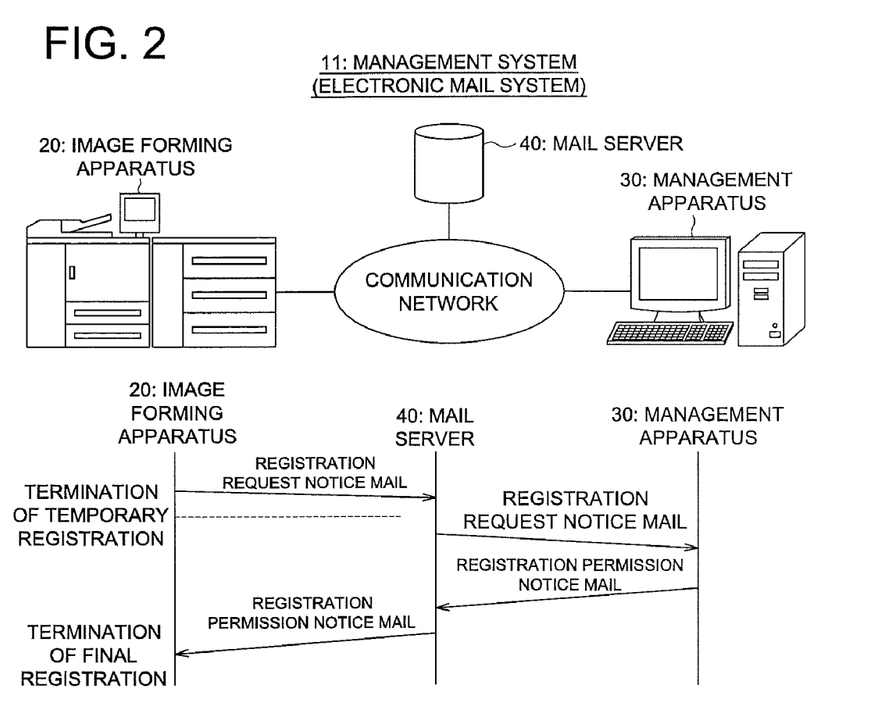
FIG. 2 is a diagram schematically representing another structure of the management system as the example of the present invention.

The management system 11 of FIG. 2 is based on the system (hereinafter referred to as "electronic mail system") wherein the image forming apparatus 20 and management apparatus 30 are connected with each other via the mail server 40 such as the TCP/IP (Transmission Control Protocol/Internet Protocol) network, SMTP (Simple Mail Transfer Protocol) server and POP (Post Office Protocol) server or IMAP (Internet Message Access Protocol) server. In this system, in the initial registration the electronic mail with the registration request notice described thereon (hereinafter referred to as "registration request notice") is sent from the image forming apparatus 20 and is stored in the mail server 40. The management apparatus 30 receives the registration request notice mail from the mail server 40 at a predetermined time interval. The electronic mail with the registration permission notice described thereon (hereinafter referred to as "registration permission notice") is sent from the management apparatus 30, and is stored in the mail server 40. The image forming apparatus 20 receives the registration permission notice mail from the mail server 40 at a predetermined time interval.

Figure 3:
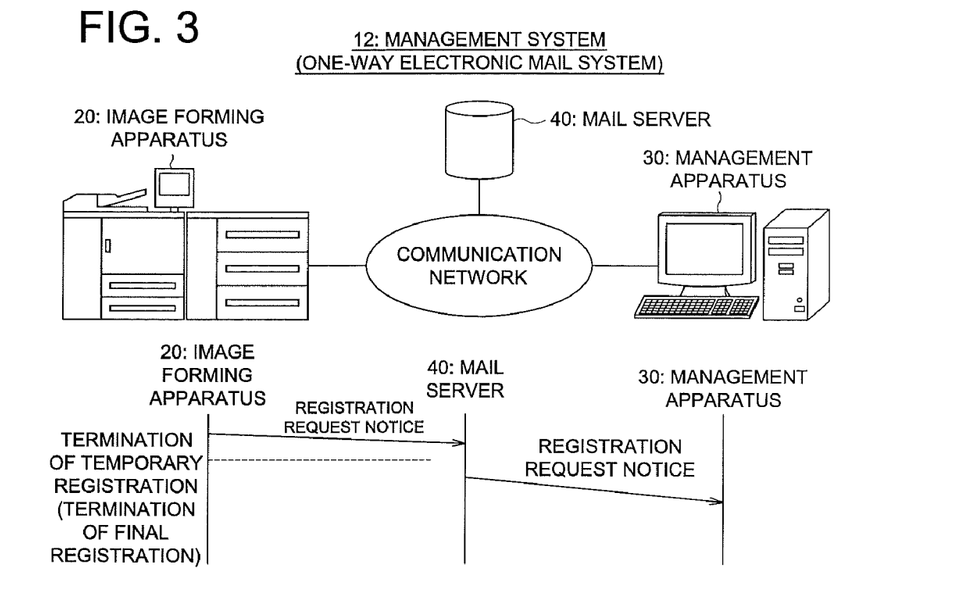
FIG. 3 is a diagram schematically representing a further structure of the management system as the example of the present invention.

The management system 12 of FIG. 3 also uses the electronic mail system. Reception of a mail from the management apparatus 30 by the image forming apparatus 20 is subjected to restriction in some cases for the sake of security. In this system, the registration request notice mail is sent from the image forming apparatus 20 in the initial registration and is stored in the mail server 40. The management apparatus 30 receives the registration request notice mail from the mail server 40 at a predetermined time interval, whereby processing terminates. In the following description, such a system will be referred to as the one-way electronic mail system.

The management system 13 of FIG. 4 uses the system wherein the image forming apparatus 20 and management apparatus 30 are connected via the TCP/IP network through the HTTP server 50 such as the WebDAV server (hereinafter referred to as "HTTP system"). In this system, the image forming apparatus 20 writes the registration request notice into the HTTP server 50 in the initial registration and the management apparatus 30 reads the registration request notice from the HTTP server 50 at a predetermined time interval. The management apparatus 30 writes the registration permission notice into the HTTP server 50 and the image forming apparatus 20 reads the registration permission notice from the HTTP server 50 at a predetermined time interval.

FIGS. 1 through 4 show the management system using the communications method based on any one of the telephone line system, electronic mail system and HTTP system. However, it is also possible to configure a system wherein pluralities of communications methods are used for communication. Further, there is no particular restriction to the contents of the registration request notice and registration permission notice. The registration request notice only needs to include the information that permits identification of the image forming apparatus 20.

Further, as shown in FIG. 5, the image forming apparatus 20 includes a controller 21, scanner 22, image processing section 23, printer section 24, storage section 25, display/operation section 26, communications controller 27 and others.

The controller 21 includes a CPU (Central Processing Unit), ROM (Read Only Memory) and RAM (Random Access Memory).

The CPU reads out various forms of program stored in the ROM in response to the operation of the display/operation section 26, and expands it on the RAM. According to the expanded program, the controller 21 controls the operation of each part of the image forming apparatus 20, and manages the status of each section. Further, the controller 21 functions as a registration controller 21*a*. If the registration controller 21*a* controls communication using the system such as the telephone line system wherein immediate mutual communication is permitted, the system determines that the final registration has terminated when the registration permission notice has been received from the management apparatus 30. If communication is performed using the system such as the electronic mail system or HTTP system wherein immediate mutual communication is not permitted, the system determines that temporary registration has terminated when the connection between the image forming apparatus 20 and mail server 40 or HTTP server 50 has been established. The system determines that the final registration has terminated when the registration permission notice mail has been received from the mail server 40 or the registration permission notice has been read out from the HTTP server 50. At the same time, control is provided in such a way that the function preset at the time of termination of the temporary registration (e.g., copying function) is enabled. This registration controller 21*a* can be formed as hardware, or a management program can be configured to permit the computer to function as the registration controller 21*a* so that this management program runs on the controller 21.

The scanner 22 reads out the information recorded on the document, and includes a light source for scanning the document, a CCD (Charge Coupled Devices) for converting into the electric signal the light reflected from the document, and an A/D converter for A/D conversion of electric signal.

The image processing section 23 applies various forms of image processing to the image having been read by the scanner 12 (hereinafter referred to as "scanned image") wherein the image processing includes enlargement/reduction, rotation, frequency conversion, color conversion from the RGB data to the YMCK data and gradation correction.

The printer section 24 includes an image forming section for forming an image to be printed on a transfer sheet, a transfer section for transferring the formed image onto the transfer sheet, a fixing section for fixing the transferred image, a conveyance section, for conveying the transfer sheet, an image forming section, a transfer section, a cleaning section for cleaning the fixing section, and others. Based on the data inputted from the electrophotographic system, an image is formed and outputted onto the transfer sheet. Further, a counter is provided to count the transfer sheets of various sizes. The management information such as the total number of the prints or the number of prints for each size is sent to the controller 21.

The storage section 25 includes a flash memory and hard disk, and stores various forms of data and setting conditions. Particularly in the present embodiment, the storage section 25 stores the identification information for identification of its own apparatus, and the management information such as the total number of prints, the number of prints for each size, frequency of use of the entire apparatus or part thereof, maintenance history, and parts replacement history.

The display/operation section 26 is structured in such a way that the pressure sensitive type operation section (touch panel) with transparent electrodes arranged in a grid-like configuration thereon is provided on the liquid crystal display apparatus (LCD: Liquid Crystal Display) or organic EL (electroluminescence) display apparatus. The power point of the XY coordinates depressed by a finger or touch pen is detected in terms of voltage value, and the position signal having been detected is outputted to the controller 12 as an operation signal. Particularly, the present embodiment displays the initial registration screen equipped with the initial registration button for indicating the start of initial registration, and is provided with a button or lamp that displays identification between termination of temporary registration and termination of final registration at the time of termination of the temporary or final registration.

The communications controller 27 connects the image forming apparatus 20 to the communications network. This communications controller 27 has different functions according to each communications method. In the case of telephone line system, the communications controller 27 works as a modem for converting the registration request notice and registration permission notice. In the case of electronic mail system, the communications controller 27 works as a mail manager for sending the registration request notice mail to the mail server 40 (SMTP server) and receiving the registration permission notice mail from the mail server 40 (POP server), and performs the functions of acquiring/creating the header information of the electronic mail, acquiring/creating the text information (attached file) of the electronic mail, encoding/decoding based on the MIME (Multipurpose Internet Mail Extension), and encryption/decryption based on the AES (Advanced Encryption Standard). In the case of the HTTP system, the communications controller 27 works as an HTTP client to provide control of writing the registration request notice into the HTTP server 50 (WebDAV server), and reading the registration permission notice from the HTTP server 50 (WebDAV server).

Further, as shown in FIG. 6, the management apparatus 30 includes a controller 31, storage section 32, display section 33, operation section 34, communications controller 35 and others.

The controller 31 contains a CPU, ROM, RAM and others. The CPU reads various forms of program stored in the ROM in response to the operation of the operation section 34, and expands them on the RAM. The CPU controls the operations of various parts of the management apparatus 30 according to the expanded program, and manages the status of the image forming apparatus 20. Further, the CPU reads the information included in the registration request notice for identifying the image forming apparatus 20, and determines whether or not to permit the registration, based on this identification information. If the CPU determined to permitted, the CPU creates a registration permission notice.

The storage section 32 includes a flash memory or hard disk, and stores various forms of data. Especially in the present embodiment, the storage section 32 stores the information for providing a basis for decision on registration permission/non-permission, and the management information such as the total number of prints, the number of prints for each size, frequency of use, maintenance history and parts replacement history that have been obtained from each image forming apparatus 20.

The display section 33 includes a liquid crystal display apparatus, organic electroluminescent display apparatus and others, and displays various forms of management screen on the screen in response to the display signal from the controller 31. Further, the operation section 34 contains a keyboard, mouse and others, and specifies transmission of the registration permission notice when a decision is made in the manual mode on whether initial registration is permitted or not.

The communications controller 35 connects the management apparatus 30 to the communications network. As described above, the communications controller 35 performs different functions according to the communications method. In the case of the telephone line system, the communications controller 35 works as a modem for converting the registration request notice and registration permission notice. In the case of electronic mail system, the communications controller 35 works as a mail manager for receiving the registration request notice mail from the mail server 40 (POP server) and sending the registration permission notice mail to the mail server 40 (SMTP server). In the case of the HTTP system, the communications controller 35 works as an HTTP client to read the registration request notice from the HTTP server 50 (WebDAV server) and to write the registration permission notice into the HTTP server 50 (WebDAV server).

It should be noted, however, that the aforementioned structure of the aforementioned image forming apparatus 20 and management apparatus 30 provides only an example, and can be modified as appropriate. For example, in FIG. 5, the image forming apparatus 20 is shown as a multi-functional peripheral equipped with a scanner 22, image processing section 23 and printer section 24. However, the image forming apparatus 20 can include a scanner, printer or photocopier. Further, it can be provided with a finishing apparatus for punching, stapling or binding.

The initial registration procedure using the management system of the aforementioned structure will be described for each communications method with reference to the flow charts of FIGS. 7 through 10.

[Telephone Line System]

Figure 7:
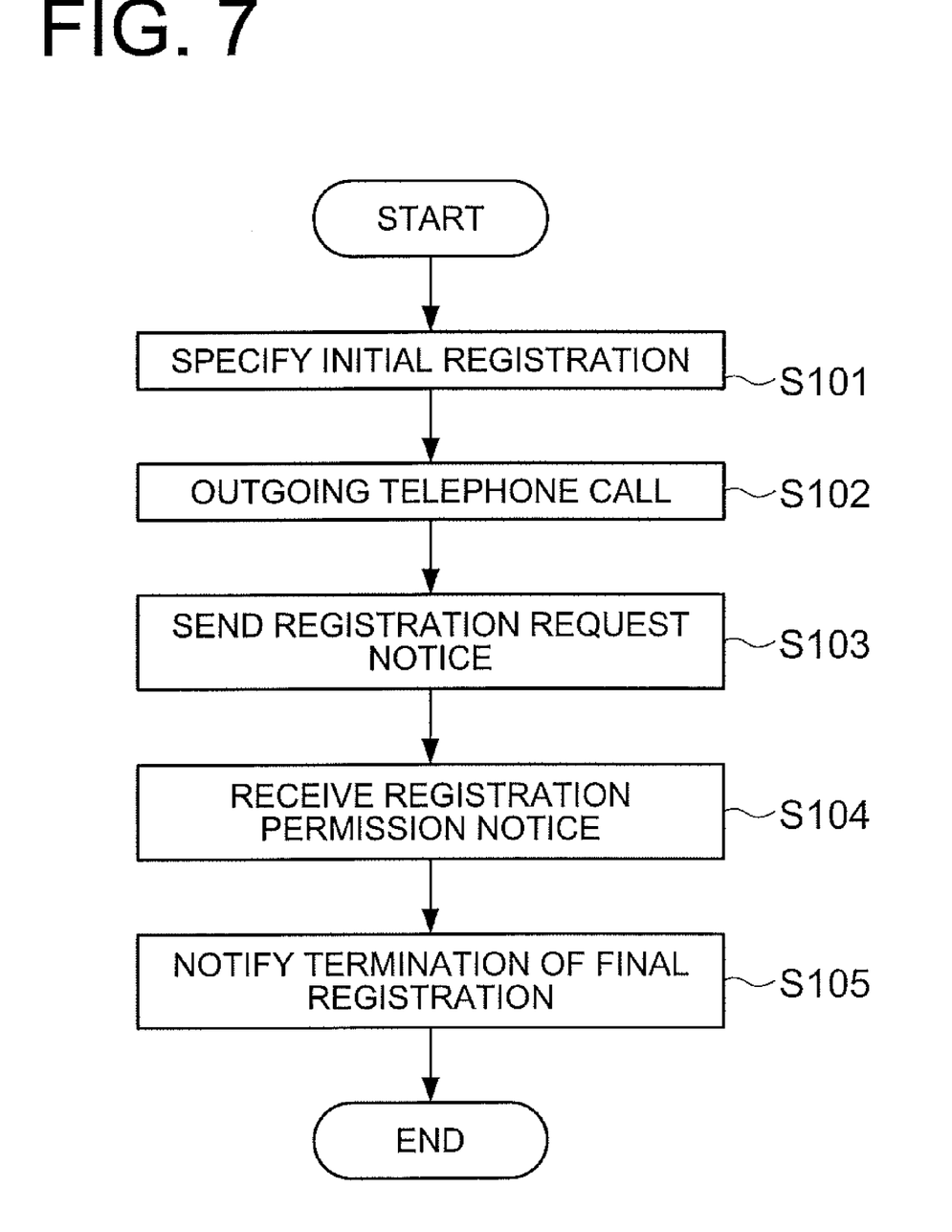
FIG. 7 is a flow chart showing the initial registration procedure using the management system (telephone line system) as the example of the present invention.

In the case of the telephone line system, in Step S101 of FIG. 7, the service person displays the initial registration on the display/operation section 26 of the image forming apparatus 20, and inputs the phone number of the management apparatus 30. After that, the service person presses the initial registration button to specify the initial registration. Then in Step S102, the controller 21 controls the communications controller 27 to call the management apparatus 30. When the telephone line has been connected, in Step S103, the controller 21 creates the registration request notice including the image forming apparatus 20 identification information stored in the storage section 25 in advance, and sends it to the management apparatus 30 through the communications controller 27.

The management apparatus 30 receives the registration request notice through the communications controller 35. The controller 31 reads the image forming apparatus 20 identification information from the registration request notice and compares it with the information stored in the storage section 32, whereby a decision is made on whether initial registration is permitted or not. When the initial registration is permitted, a registration permission notice is created and is sent to the image forming apparatus 20 through the communications controller 35.

Once the telephone or fax has been connected, direct communication is possible in-between, and therefore, mutual information exchange can be made almost immediately. It should be noted, however, that a decision on whether initial registration is permitted or not can be made by the controller 31, or the operator can check the registration request notice to make a decision. Further, when initial registration is not permitted, a registration non-permission notice may be sent or a reply may not be given.

In Step S104, when the image forming apparatus 20 has received registration permission notice through the communications controller 27, the registration controller 21a determines in Step S105 that the final registration has terminated, when the registration permission notice has been received, and allows a predetermined button or lamp on the display/operation section 26 to display this notice, or allows the chime or buzzer to produce the sound of notice, whereby the service person is notified of the fact that the final registration has terminated. Under this condition, all the functions of the image forming apparatus 20 are enabled.

[Electronic Mail System]

Figure 8:
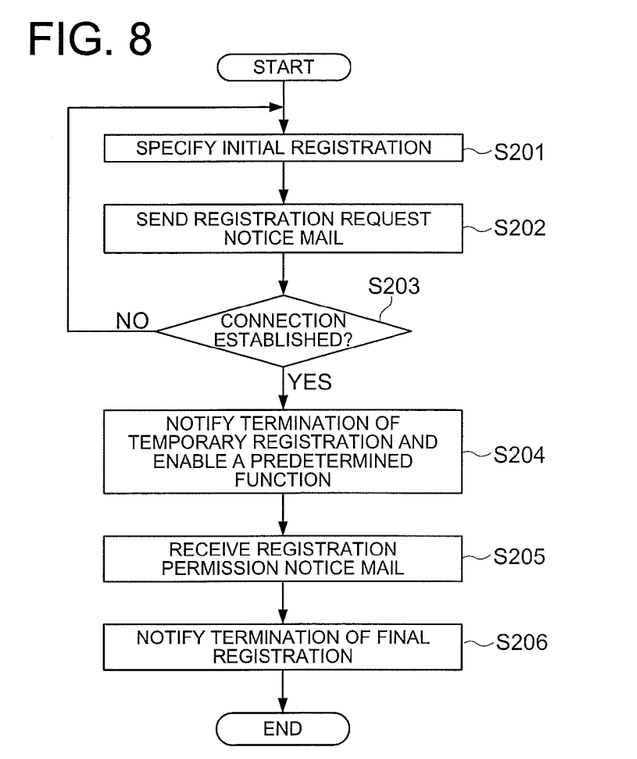
FIG. 8 is a flow chart showing the initial registration procedure using the management system (electronic mail system) as the example of the present invention.

In the case of the electronic mail system, in Step S201 of FIG. 8, the service person displays the initial registration on the display/operation section 26 of the image forming apparatus 20, and inputs the electronic mail address of the management apparatus 30. After that, the service person presses the initial registration button to specify the initial registration. Then in Step S202, the controller 21 creates the registration request notice mail including the image forming apparatus 20 identification information stored in the storage section 25 in advance, and sends it to the mail server 40 through the communications controller 27.

In the case of the telephone line system, the registration permission notice in response to registration request notice can be received immediately. In the case of the electronic mail system, however, the image forming apparatus 20 is not allowed to have direct communication with the management apparatus 30. Communication must be made through the intermediary of the mail server 40, and exchange of electronic mail is generally carried out at predetermined communications intervals. This produces a time lag. In the meantime, if the electronic mail contains a wrong address or the communications network is congested, an error message is immediately issued from the communications controller 27 working as a mail manager.

Thus, in the case of the electronic mail system, the registration controller 21a determines in Step S203 that the connection between the image forming apparatus 20 and mail server 40 is established if an error message has not been notified. In Step S204, that temporary registration is determined to have terminated, and a predetermined button or lamp on the display/operation section 26 is displayed, or the chime or buzzer produces sounds to notify the service person of the termination of temporary registration. Of the functions of the image forming apparatus 20, the functions that do not require registration (e.g., copying function) are enabled, subsequent to termination of the temporary registration.

In the meantime, the management apparatus 30 accesses the mail server 40 at predetermined time intervals, and receives the registration request notice mail if the mail server 40 contains the registration request notice mail addressed to that apparatus. The controller 31 reads the image forming apparatus 20 identification information from the registration request notice mail and compares it with the information stored in the storage section 32, whereby a decision is made on whether initial registration is permitted or not. When the initial registration is permitted, a registration permission notice mail is created and is sent to the mail server 40 through the communications controller 35.

In Step S205, the image forming apparatus 20 accesses the mail server 40 at predetermined time intervals, and receives the registration permission notice mail from the mail server 40 through the communications controller 27. Then in Step S206, the registration controller 21a determines in Step S105 that the final registration has terminated, when the registration permission notice has been received, and allows a predetermined button or lamp on the display/operation section 26 to display this notice, or allows the chime or buzzer to produce the sound of notice, whereby the service person is notified of the fact that the final registration has terminated. Under this condition, all the functions of the image forming apparatus 20 are enabled.

[One-Way Electronic Mail System]

Figure 9:
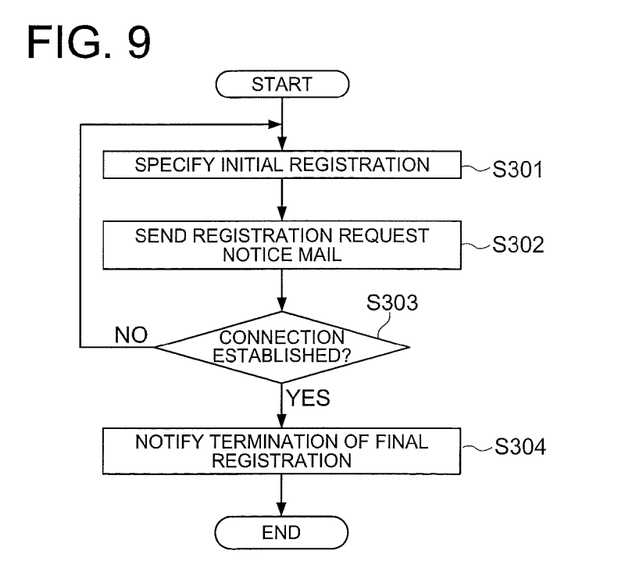
FIG. 9 is a flow chart showing the initial registration procedure using the management system (one-way electronic mail system) as the example of the present invention.

In the case of the one-way electronic mail system, in Step S301 of FIG. 9, the service person displays the initial registration on the display/operation section 26 of the image forming apparatus 20, and inputs the electronic mail address of the management apparatus 30. After that, the service person presses the initial registration button to specify the initial registration. Then in Step S302, the controller 21 creates the registration request notice mail including the image forming apparatus 20 identification information stored in the storage section 25 in advance, and sends it to the mail server 40 through the communications controller 27.

In the case of the one-way electronic mail system, only the registration request notice mail is sent from the image forming apparatus 20, without the registration permission notice mail received from the management apparatus 30. Accordingly, when connection between the image forming apparatus 20 and mail server 40 has been established in Step S303, the registration controller 21a determines in Step S304 that the final registration has terminated, and allows a predetermined button or lamp on the display/operation section 26 to display this notice, or allows the chime or buzzer to produce the sound of notice, whereby the service person is notified of the fact that the final registration has terminated. Under this condition, all the functions of the image forming apparatus 20 are enabled.

[HTTP System]

Figure 10:
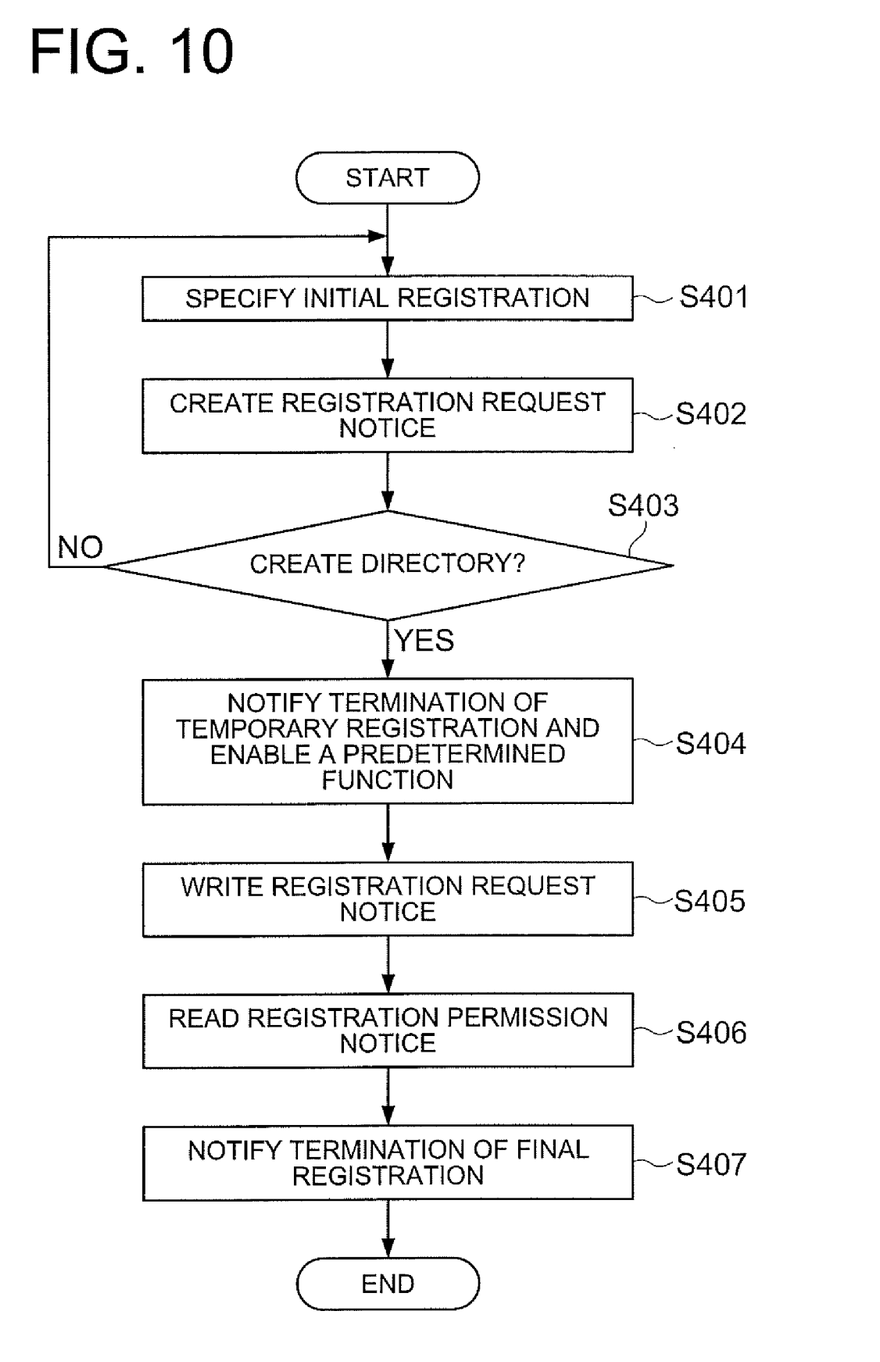
FIG. 10 is a flow chart showing the initial registration procedure using the management system (HTTP system) as the example of the present invention.

In the case of the HTTP system, in Step S401 of FIG. 10, the service person displays the initial registration on the display/operation section 26 of the image forming apparatus 20, and presses the initial registration button to specify the initial registration. Then in Step S402, the controller 21 creates the registration request notice including the image forming apparatus 20 identification information stored in the storage section 25.

In the case of the HTTP system, communication must be made through the intermediary of the HTTP server 50. In the HTTP server 50, management is carried out by sorting and arranging the information of each image forming apparatus 20 using the directory management and others. Thus, in Step S403, if a directory can be created in the HTTP server 50, the registration controller 21a determines in Step S404 that the connection between the image forming apparatus 20 and HTTP server 50 has been established, and allows a predetermined button or lamp on the display/operation section 26 to display this notice, or allows the chime or buzzer to produce the sound of notice, whereby the service person is notified of the fact that the final registration has terminated. After termination of temporary registration, predetermined functions of the image forming apparatus 20 are enabled.

After that, in Step S405, the controller 21 writes the registration request notice on the directory having been created, and the management apparatus 30 accesses the HTTP server 50 at predetermined time intervals. If there is a new directory created in the HTTP server 50, the management apparatus 30 reads the registration request notice in the directory using the communications controller 35. The controller 31 reads the image forming apparatus 20 identification information from the registration request notice and compares it with the information stored in the storage section 32, whereby a decision is made on whether initial registration is permitted or not. If the initial registration is permitted, a registration permission notice is created and is written into the HTTP server 50 using the communications controller 35.

In Step S406, the image forming apparatus 20 accesses the HTTP server 50 at predetermined time intervals. If the registration permission notice is written in the directory of the HTTP server 50, the image forming apparatus 20 reads the registration permission notice using the communications controller 27. In Step S407, the registration controller 21a determines that the final registration has terminated, when the registration permission notice has been read. The registration controller 21a allows a predetermined button or lamp on the display/operation section 26 to display this notice, or allows the chime or buzzer to produce the sound of notice, whereby the service person is notified of the fact that the final registration has terminated. Under this condition, all the functions of the image forming apparatus 20 are enabled.

In the case of the HTTP system, the image forming apparatus 20 can be managed based on the directory in the HTTP server 50. This will make it possible in the future to configure a complete system by running the program of processing the directory information inside the HTTP server 50 without the need of the management apparatus 20, whereby the general versatility of the management system can be enhanced.

Although communication can be made with the mail server 40 and HTTP server 50 by the temporary registration in the aforementioned electronic mail system or HTTP system, management is not necessarily ensured by the management apparatus 30. Further, in the image forming apparatus 20, information can be asynchronously sent to the mail server 40 or HTTP server 50 after initial registration, but there is no knowing whether or not communication is being made with the mail server 40 or HTTP server 50 and management apparatus 30. This may require that selection should be made possible by initial setting on the side of the image forming apparatus 20 as to whether or not a decision should be made on the termination of temporary registration in initial registration, so that the reliable management of the image forming apparatus 20 is ensured, for example. If this is required, setting is provided, for example, in such a way that decision is not made on the termination of temporary registration. In this manner, initial registration procedure can be modified according to particular requirements.

As described above, the controller 21 of the image forming apparatus 20 is provided with a registration controller 21a as hardware or software, and registration controller 21a uses the communications method wherein immediate mutual communication can be made as in the telephone line, for example. In this case, when the image forming apparatus 20 has received a registration permission notice from the management apparatus 30, the registration is determined to have terminated. In the case of the communications method wherein a server is present as in the electronic mail system or HTTP system, temporary registration is determined to have terminated, when connection between the image forming apparatus 20 and server has been established. Registration is determined to have terminated, when the image forming apparatus 20 has acquired a registration permission notice from the management apparatus 30. Introduction of the concept "temporary registration" ensures quick initial registration to be achieved. Thus, predetermined functions of the image forming apparatus 20 are enabled at the time of termination of the temporary registration, whereby user convenience is enhanced. Further, the procedure and timing for initial registration are unified and the maneuverability at the time of initial registration is enhanced.

The aforementioned Example refers to the case wherein the image forming apparatus 20 is managed. Without being restricted thereto, however, the present invention is similarly applicable to a desired managed apparatus managed by the management apparatus 20.

The management system, management method and management program of the present invention provide the following advantages:

The first advantage of the present invention is that quick initial registration can be performed, independently of the type of communications method to be utilized. This is due to the following reasons: When using such a communications method as the telephone line system that permits immediate mutual communication, the system determines that registration has terminated if the managed apparatus has received a registration permission notice from the management apparatus. In the communications method where a server is used as in the case of the electronic mail system or HTTP system, the system determines that temporary registration has terminated when the connection between the managed apparatus and server has been established. The system determines that the registration has terminated when the managed apparatus has acquired the registration permission notice from the management apparatus. Thus, introduction of the concept of "temporary registration" eliminates the need of waiting for a reply from the management apparatus.

The second advantage of the present invention is the initial registration that can be achieved easily, independently of the communications method to be utilized. This is because introduction of the concept of "temporary registration" allows initial registration to be achieved by the similar procedure at the similar time period, independently of any communications method without being conscious of the communications method.

The third advantage of the present invention is that a highly versatile management system can be provided. This is because selection can be made as to the use of decision on temporary registration. Depending on a particular circumstance, selection can be made to use a reliable (but slow) final registration or a simple (but not very reliable) temporary registration. In the case of the HTTP system, managed apparatus can be managed by the directory information of the HTTP server (WebDAV server). This makes it possible to perform management when the server is independent.

INDUSTRIAL FIELD OF APPLICATION

The present invention is applicable to a managed apparatus connected to the management apparatus in various forms of communications method; a management system including the management apparatus and managed apparatus; a management method of this management system; and a management program running on the managed apparatus.

What is claimed is:

1. A management system comprising a management apparatus and a managed apparatus which being managed by the management apparatus, connected with each other by a communications network, wherein in an initial registration phase where the managed apparatus sends a registration request notice to the management apparatus, and the management apparatus returns a registration permission notice to the managed apparatus in response to the registration request notice;

the management system comprising a registration controller which is configured:
to determine, in cases where one of first communications methods including a method via a telephone line is utilized that enables immediate mutual communication between the management apparatus and the managed apparatus, that a final registration has completed at a phase when the managed apparatus has received the registration permission notice from the management apparatus, and to enable the managed apparatus to use all functions, which include a function requiring a registration from a viewpoint of security, of the managed apparatus; and
in cases where one of second communications methods via a server including a mail server or a HTTP server is utilized between the management apparatus and managed apparatus, to determine that a temporary registration has completed at a phase when connection between the managed apparatus and the server has been established, and to enable the managed apparatus to use only preset functions, which do not require any registration from the viewpoint of security and include a copying function of an original document set on the managed apparatus, among the all functions of the managed apparatus, and at a phase when the managed apparatus has acquired the registration permission notice from the management apparatus after the temporary registration having completed, to determine that the final registration has completed, and to enable the managed apparatus to use the all functions of the managed apparatus.

2. The management system of claim 1, further comprising a display section which discriminatively displays the completion of the temporary registration and the completion of the final registration.

3. The management system of claim 1, wherein in said one of the first communications methods the management apparatus and the managed apparatus are connected via a telephone line, and in said one of the second communications methods the management apparatus and the managed apparatus are connected via a mail server or an HTTP server.

4. The management system of claim 3, wherein the phase when the connection between the managed apparatus and the server has been established is one of a phase when the managed apparatus has sent a mail of the registration request notice to the mail server, and a phase when the managed apparatus has created a directory to store the registration request notice into the HTTP server.

5. The management system of claim 1, wherein the registration controller is configured to make selection as to whether or not to make the decision of completion of the temporary registration in the case of the second communications method.

6. A management method for a management system comprising a management apparatus and a managed apparatus which being managed by the management apparatus, connected with each other by a communications network, wherein in an initial registration phase where the managed apparatus sends a registration request notice to the management apparatus and the management apparatus returns a registration permission notice to the managed apparatus in response to the registration request notice, the management method comprising:

determining that a final registration has completed at a phase when the managed apparatus has received the registration permission notice from the management apparatus in cases where one of first communications methods including a method via a telephone line is utilized that permits immediate mutual communication between the management apparatus and the managed apparatus, and enabling the managed apparatus to use all functions, which include a function requiring a registration from a viewpoint of security, of the managed apparatus;
in cases where one of second communications methods via a server including a mail server or a HTTP server is utilized between the management apparatus and managed apparatus determining that a temporary registration has completed at a phase when connection between the managed apparatus and the server has been established, and enabling the managed apparatus to use only preset functions, which do not require any registration from the viewpoint of security and include a copying function of an original document set on the managed apparatus, among the all functions of the managed apparatus, and
determining that the final registration has completed at a phase when the managed apparatus has acquired the registration permission notice from the management apparatus after the temporary registration having completed, and enabling the managed apparatus to use the all function of the managed apparatus when the final registration is completed.

7. The management method of claim 6, further comprising a step of discriminatively displaying the completion of the temporary registration and the completion of the final registration.

8. The management method of claim 6, wherein in said one of the first communications methods the management apparatus and the managed apparatus are connected via a telephone line, and in said one of the second communications methods the management apparatus and the managed apparatus are connected via a mail server or an HTTP server.

9. The management method of claim 8, wherein the phase when the connection between the managed apparatus and the server has been established is one of a phase when the managed apparatus has sent a mail of the registration request notice to the mail server, and a phase when the managed apparatus has created a directory to store the registration request notice into the HTTP server.

10. A non-transitory computer-readable storage medium stored therein a management program which is executable by a processor of a managed apparatus connected with a management apparatus via communications network, the management program, which when executed by the processor in an initial registration phase where the managed apparatus sends a registration request notice to the management apparatus, and the management apparatus returns a registration permission notice to the managed apparatus in response to the registration request notice, performing:

determining that a final registration has completed at a phase when the managed apparatus has received the registration permission notice form the management apparatus in cases where one of a first communications methods including a method via a telephone line is utilized that permits immediate mutual communication between the management apparatus and the managed apparatus, and enabling the managed apparatus to use all functions, which include a function requiring a registration from a viewpoint of security, of the managed apparatus; and in cases where one of second communications methods via a server including a mail server or a HTTP server is utilized between the management apparatus and managed apparatus, determining that a temporary registration has completed at a phase when connection between the managed apparatus and the server has been established, and enabling the managed apparatus to use only preset functions, which do not require any registration from the viewpoint of security and include a copying function of an original document set on the managed apparatus, among the all functions of the managed apparatus, and determining that the final registration has completed at a phase when the managed apparatus has acquired the registration permission notice from the management apparatus after the temporary registration having completed, and enabling the managed apparatus to use the all functions of the managed apparatus when the final registration is completed.

11. The computer-readable storage medium of claim 10, wherein in said one of the first communications methods the management apparatus and the managed apparatus are connected via a telephone line, and in said one of the second communications methods the management apparatus and the managed apparatus are connected via a mail server or an HTTP server.

12. The computer-readable storage medium of claim 11, wherein the phase when the connection between the managed apparatus and the server has been established is one of a phase when the managed apparatus has sent a mail of the registration request notice to the mail server, and a phase when the managed apparatus has created a directory to store the registration request notice into the HTTP server.

13. The computer-readable storage medium of claim 10, wherein the registration controller is configured to make selection as to whether or not to make the decision of completion of the temporary registration in the case of the second communications method.

* * * * *